(12) United States Patent
Fujishima

(10) Patent No.: US 9,217,438 B2
(45) Date of Patent: Dec. 22, 2015

(54) PUMP CONTROL DEVICE AND PUMP DEVICE

(75) Inventor: Makoto Fujishima, Nagano (JP)

(73) Assignee: NIDEC SANKYO CORPORATION (JP)

( * ) Notice: Subject to any disclaimer, the term of this patent is extended or adjusted under 35 U.S.C. 154(b) by 935 days.

(21) Appl. No.: 13/246,959

(22) Filed: Sep. 28, 2011

(65) Prior Publication Data

US 2012/0100009 A1 Apr. 26, 2012

(30) Foreign Application Priority Data

Oct. 20, 2010 (JP) .................. 2010-235394

(51) Int. Cl.
- *F04B 49/06* (2006.01)
- *H02P 1/04* (2006.01)
- *F04D 15/00* (2006.01)

(52) U.S. Cl.
CPC .............. *F04D 15/0066* (2013.01); *H02P 1/04* (2013.01)

(58) Field of Classification Search
CPC ................................ H02P 1/04; F04D 15/0066
USPC .................. 417/22, 42, 44.1; 318/400.09
See application file for complete search history.

(56) References Cited

U.S. PATENT DOCUMENTS

| 2007/0024231 | A1* | 2/2007 | Lee et al. ........................ 318/802 |
| 2010/0130809 | A1* | 5/2010 | Morello ........................... 600/16 |
| 2011/0256005 | A1* | 10/2011 | Takeoka et al. ................ 417/415 |
| 2011/0279070 | A1* | 11/2011 | Tanaka et al. ............... 318/400.1 |

FOREIGN PATENT DOCUMENTS

| JP | 2003219681 A | * | 7/2003 | ................ H02P 6/16 |
| JP | 2007-120367 A | | 5/2007 | |

* cited by examiner

*Primary Examiner* — Peter J Bertheaud
*Assistant Examiner* — Dominick L Plakkoottam
(74) *Attorney, Agent, or Firm* — Cantor Colburn LLP

(57) ABSTRACT

A pump control device for a pump device having a DC brushless motor as a drive source and a flow rate of the pump device is increased and decreased depending on a corresponding increase and decrease of a rotational speed of the DC brushless motor is structured so that, when the rotational speed of the DC brushless motor is higher than a predetermined speed, the DC brushless motor is controlled in an open loop control and, when the rotational speed of the DC brushless motor is lower than the predetermined speed, the DC brushless motor is controlled in a closed loop control on the basis of a measurement result of an actual rotating speed which is an actual rotational speed of the DC brushless motor.

12 Claims, 3 Drawing Sheets

PUMP CONTROL DEVICE AND PUMP DEVICE

CROSS REFERENCE TO RELATED APPLICATION

The present invention claims priority under 35 U.S.C. §119 to Japanese Application No. 2010-235394 filed Oct. 20, 2010, the entire contents of which are incorporated herein by reference.

FIELD OF THE INVENTION

At least an embodiment of the present invention may relate to a pump control device which controls a DC brushless motor as a drive source of a pump device. Further, at least an embodiment of the present invention may relate to a pump device which is provided with the pump control device.

BACKGROUND

A pump device has been conventionally known which is provided with an impeller and a DC brushless motor (motor) for rotating the impeller (see, for example, Japanese Patent Laid-Open No. 2007-120367). In the pump device described in this Patent Literature, a flow rate of the pump device is increased and decreased depending on increase and decrease of a rotational speed of the motor. Further, in the pump device, a power source voltage change circuit, a PWM circuit and a drive circuit are disposed between a control circuit for controlling a flow rate of the pump device and the motor. The power source voltage change circuit is a circuit which increases and decreases an output voltage of a motor drive power source based on an output signal which is outputted from the control circuit depending on a target flow rate of the pump device. The PWM circuit is a circuit which generates a PWM signal whose duty ratio is varied based on the output signal from the control circuit and the drive circuit is a switching circuit which performs on/off operations of an output voltage from the power source voltage change circuit according to the PWM signal.

Further, conventionally, a closed loop control and an open loop control have been known as a control method for a DC brushless motor. In the closed loop control, the motor is controlled while a measured result of an actual rotating speed of the motor is fed back and, in the open loop control, the motor is controlled under a condition that a measured result of an actual rotating speed of the motor is not fed back. A rotational speed of the motor is controlled with a high degree of accuracy in a closed loop control. However, in the pump device described in the above-mentioned Patent Literature, the motor is controlled in an open loop control in order to simplify the control of the pump device.

However, when a motor is controlled in an open loop control like the pump device described in the above-mentioned Patent Literature, a rotational speed of the motor is varied due to variations of circuit elements which structure a circuit for driving the motor and, as a result, a flow rate of the pump device is varied. Further, when a motor is controlled in an open loop control, a rotational speed of the motor is varied due to variation of a pressure loss depending on conditions of piping connected to the pump device, variation of a voltage of the motor drive power source, variation of a motor load and the like and, as a result, a flow rate of the pump device is varied.

Especially, a PWM duty ratio is lowered at the time of a low flow rate when a flow rate of the pump device is small and thus a rotational speed of the motor is lowered and its motor torque becomes small. Therefore, at the time of a low flow rate, the flow rate is easily affected by a load variation and the like and, as a result, a variation rate of an actual flow rate with respect to a target flow rate of the pump device becomes large.

SUMMARY

In view of the problem described above, at least an embodiment of the present invention may advantageously provide a pump control device which is capable of reducing a variation rate of an actual flow rate with respect to a target flow rate of a pump device at the time of a low flow rate while a control of the pump device is simplified. Further, at least an embodiment of the present invention may advantageously provide a pump device which is provided with the pump control device.

According to at least an embodiment of the present invention, there may be provided a pump control device for a pump device having a DC brushless motor as a drive source and a flow rate of the pump device is increased and decreased depending on increase and decrease of a rotational speed of the DC brushless motor. In the pump control device, when the rotational speed of the DC brushless motor is higher than a predetermined speed, the DC brushless motor is controlled in an open loop control and, when the rotational speed of the DC brushless motor is lower than the predetermined speed, the DC brushless motor is controlled in a closed loop control on the basis of a measurement result of an actual rotating speed which is an actual rotational speed of the DC brushless motor.

For example, in accordance with an embodiment of the present invention, in a case that the rotational speed of the DC brushless motor is higher than the predetermined speed, a level of a speed control signal for the DC brushless motor is inputted as a higher value than a predetermined reference value, when the level of the speed control signal is higher than the predetermined reference value, the DC brushless motor is controlled in the open loop control and, when the level of the speed control signal is lower than the predetermined reference value, the DC brushless motor is controlled in the closed loop control. Alternatively, in a case that the rotational speed of the DC brushless motor is higher than the predetermined speed, a level of a speed control signal for the DC brushless motor is inputted as a lower value than a predetermined reference value, when the level of the speed control signal is lower than the predetermined reference value, the DC brushless motor is controlled in the open loop control and, when the level of the speed control signal is higher than the predetermined reference value, the DC brushless motor is controlled in the closed loop control.

In accordance with an embodiment of the present invention, the pump control device includes a motor drive section which drives the DC brushless motor, a comparison section which compares the level of the speed control signal with the predetermined reference value, a feedback control signal output section into which a detection signal of the actual rotating speed and the speed control signal are inputted and which outputs a feedback control signal for coinciding the actual rotating speed with a target rotational speed of the DC brushless motor that is calculated based on the speed control signal, and a switching section which outputs one of the speed control signal and the feedback control signal to the motor drive section on the basis of a comparison result in the comparison section.

Further, in accordance with an embodiment of the present invention, the speed control signal is an analog signal corresponding to a speed control voltage for the DC brushless motor.

In the pump control device in accordance with an embodiment of the present invention, when the rotational speed of the DC brushless motor is higher than a predetermined speed, the DC brushless motor is controlled in an open loop control and, when the rotational speed of the DC brushless motor is lower than the predetermined speed, the DC brushless motor is controlled in a closed loop control. Therefore, in an embodiment of the present invention, for example, in a case that a level of a speed control signal for the DC brushless motor becomes higher as a speed control voltage of the DC brushless motor becomes higher, when the speed control voltage is higher than a reference voltage, the DC brushless motor is controlled in an open loop control and, when the speed control voltage is lower than the reference voltage, the DC brushless motor is controlled in a closed loop control.

Alternatively, in the pump control device in accordance with an embodiment of the present invention, when a level of the speed control signal is lower than a predetermined reference value, the DC brushless motor is controlled in an open loop control and, when the level of the speed control signal is higher than the predetermined reference value, the DC brushless motor is controlled in a closed loop control. Therefore, in an embodiment of the present invention, for example, in a case that a level of a speed control signal for the DC brushless motor becomes lower as a speed control voltage of the DC brushless motor becomes higher, when the speed control voltage is higher than a reference voltage, the DC brushless motor is controlled in an open loop control and, when the speed control voltage is lower than the reference voltage, the DC brushless motor is controlled in a closed loop control.

Therefore, in the embodiment of the present invention, when the rotational speed of the DC brushless motor is relatively high and thus, when a flow rate of the pump device is relatively large, the DC brushless motor is controlled in an open loop control and, at the time of a low flow rate when the rotational speed of the DC brushless motor is low and a flow rate of the pump device is small, the DC brushless motor is controlled in a closed loop control. As a result, in the embodiment of the present invention, when a flow rate of the pump device is relatively large, a control for the pump device is simplified. In addition, at the time of a low flow rate, the rotational speed of the DC brushless motor is controlled with a high degree of accuracy and a flow rate of the pump device is controlled with a high degree of accuracy. In other words, in the embodiment of the present invention, a variation rate of an actual flow rate to a target flow rate of the pump device is reduced at the time of a low flow rate while a control for the pump device is simplified.

Further, in the pump control device in accordance with an embodiment of the present invention, when a frequency of the speed control signal of the DC brushless motor which is determined depending on a target flow rate of the pump device is higher than a predetermined reference value, the DC brushless motor is controlled in an open loop control and, when the frequency of the speed control signal is lower than the predetermined reference value, the DC brushless motor is controlled in a closed loop control on the basis of a measurement result of an actual rotating speed which is an actual rotational speed of the DC brushless motor.

In the pump control device in accordance with an embodiment of the present invention, when the frequency of the speed control signal is higher than a predetermined reference value, the DC brushless motor is controlled in an open loop control and, when the frequency of the speed control signal is lower than the predetermined reference value, the DC brushless motor is controlled in a closed loop control. Therefore, in the embodiment of the present invention, when the rotational speed of the DC brushless motor is relatively high and thus, when a flow rate of the pump device is relatively large, the DC brushless motor is controlled in an open loop control and, at the time of a low flow rate when the rotational speed of the DC brushless motor is low and a flow rate of the pump device is small, the DC brushless motor is controlled in a closed loop control. As a result, in the embodiment of the present invention, when a flow rate of the pump device is relatively large, a control for the pump device is simplified and, in addition, at the time of a low flow rate, the rotational speed of the DC brushless motor is controlled with a high degree of accuracy and a flow rate of the pump device is controlled with a high degree of accuracy. In other words, in the embodiment of the present invention, a variation rate of an actual flow rate to a target flow rate of the pump device is reduced at the time of a low flow rate while a control for the pump device is simplified.

The pump control device in accordance with the embodiment of the present invention may be used in a pump device. In the pump device, a variation rate of an actual flow rate to a target flow rate of the pump device is reduced at the time of a low flow rate while a control for the pump device is simplified.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Embodiments of the present invention will be described below with reference to the accompanying drawings.

Figure 1:
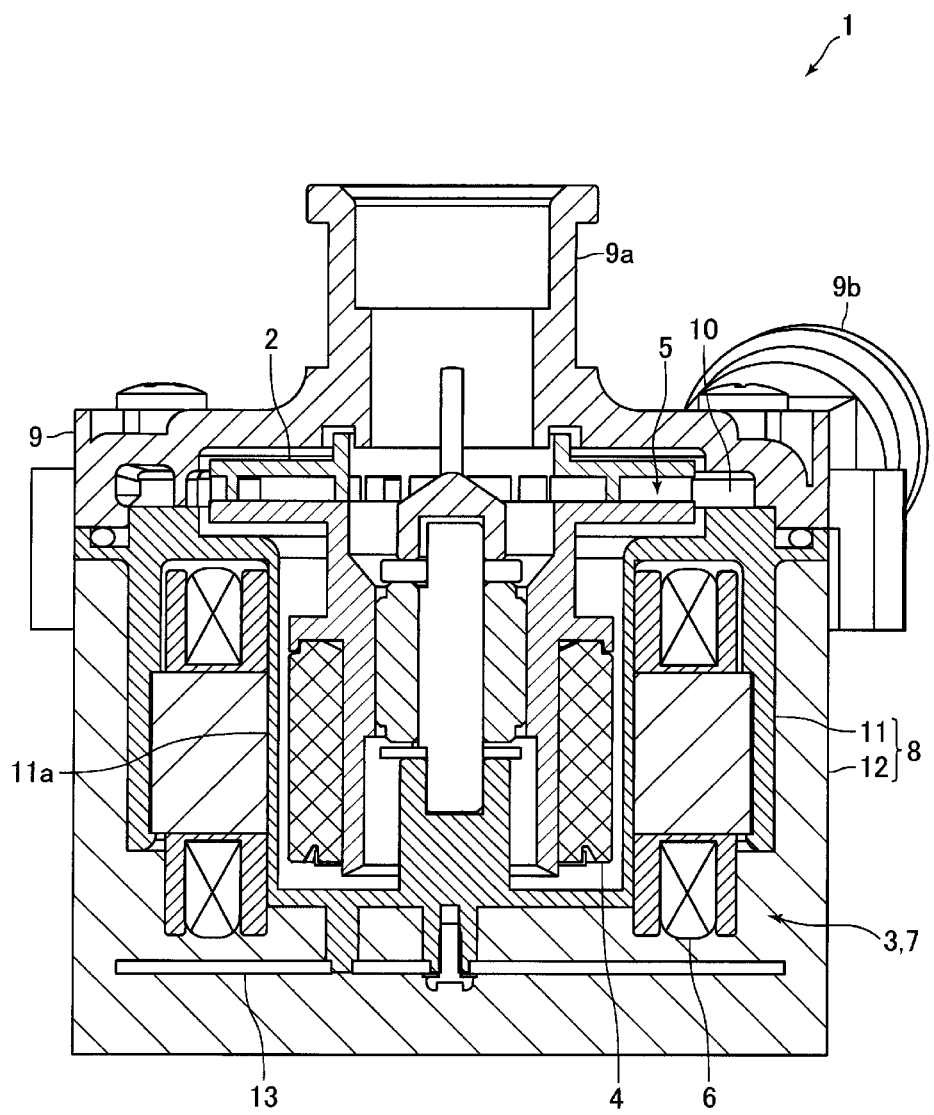
FIG. 1 is a cross-sectional view showing a pump device in accordance with an embodiment of the present invention.
Figure 2:
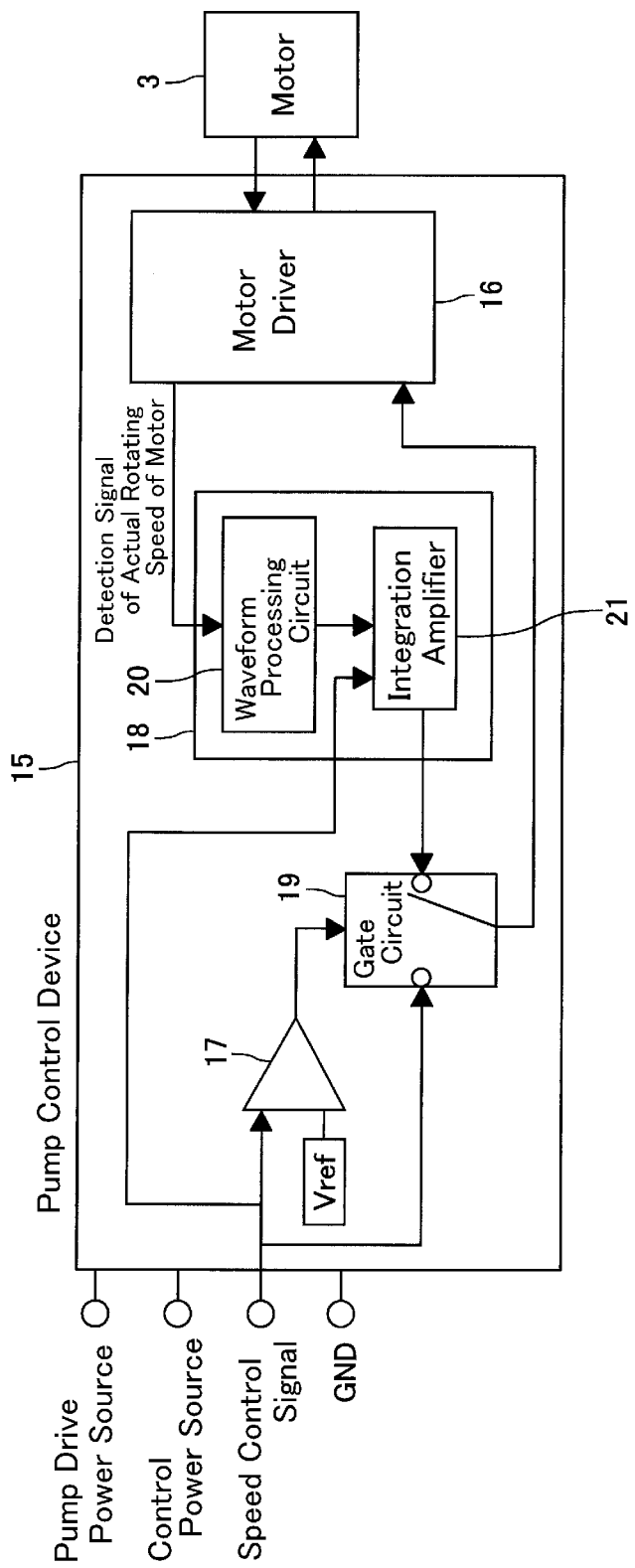
FIG. 2 is a block diagram showing a pump control device which controls a DC brushless motor shown in FIG. 1.

FIG. 1 is a cross-sectional view showing a pump device 1 in accordance with an embodiment of the present invention. FIG. 2 is a block diagram showing a pump control device 15 which controls a DC brushless motor 3 shown in FIG. 1.

A pump device 1 in this embodiment is a pump referred to as a canned pump, which is provided with an impeller 2 and a DC brushless motor 3 (hereinafter referred to as a "motor 3") as a drive source for rotating the impeller 2. In the pump device 1, a flow rate (discharge amount) of the pump device 1 is increased and decreased depending on increase and decrease of a rotational speed of the motor 3. Specifically, the motor 3 in this embodiment is PWM-controlled and a flow rate of the pump device 1 is increased and decreased so as to be in nearly proportion (direct proportion) to the increase and decrease of the rotational speed of the motor 3 by varying a PWM duty ratio. The motor 3 is structured of a rotor 5 having a drive magnet 4 and a stator 7 having a drive coil 6. The impeller 2 and the motor 3 are disposed in an inside of a case body which is structured of a housing 8 and an upper case 9 covering an upper part of the housing 8.

The upper case 9 is formed with a suction part 9*a* for fluid and a discharge part 9*b* for the fluid. A pump chamber 10 through which fluid sucked from the suction part 9*a* is passed toward the discharge part 9*b* is formed between the housing 8 and the upper case 9. The impeller 2 is fixed to the rotor 5 and the impeller 2 and the rotor 5 are disposed in the inside of the pump chamber 10.

The housing 8 is provided with a partition member 11 having a partition wall 11*a*, which is disposed between the pump chamber 10 and the stator 7 so as to separate the pump chamber 10 from the stator 7, and a resin member 12 made of resin which covers an under face and a side face of the partition member 11. An inner peripheral side of the partition wall 11*a* structures a part of the pump chamber 10. The stator 7 is disposed on an outer peripheral side of the partition wall 11*a*. Further, an outer peripheral side and an under face of the stator 7 are covered by the resin member 12.

The pump device 1 is provided with a pump control device 15 which controls the motor 3 to control a flow rate (discharge amount) of the pump device 1. The pump control device 15 is mounted on a circuit board 13 which is fixed to an under face side of the partition member 11. As shown in FIG. 2, the pump control device 15 is connected with a pump drive power source and a control power source. Further, the pump control device 15 is connected with a control section of a host device on which the pump device 1 is mounted and a speed control signal for the motor 3 which is determined depending on a target flow rate of the pump device 1 is inputted to the pump control device 15 at the time of driving of the pump device 1. The speed control signal in this embodiment is an analog signal corresponding to a speed control voltage for the motor 3 and a level of the speed control signal becomes higher as a rotational speed of the motor is increased (higher), in other words, as a speed control voltage becomes higher. In this embodiment, a relationship between a target flow rate of the pump device 1 and a speed control signal is stored in a tabled form in the control section of the host device.

The pump control device 15 is provided with a motor driver 16 (hereinafter, referred to as a "driver 16") as a motor drive section for driving the motor 3, a comparator 17 as a comparison section which compares a level of a speed control signal inputted from the control section of the host device with a predetermined reference value, a feedback control signal output circuit 18 as a feedback control signal output section for outputting a feedback control signal for closed-loop controlling (feedback controlling) the motor 3, and a gate circuit 19 as a switching section which inputs one of the speed control signal and the feedback control signal to the driver 16 based on a comparison result in the comparator 17.

The feedback control signal output circuit 18 is provided with a waveform processing circuit (one-shot multi) 20 and an integration amplifier 21. The feedback control signal output circuit 18 creates and outputs a feedback control signal for coinciding an actual rotating speed, which is an actual rotating speed of the motor 3, with a target rotational speed of the motor 3 which is calculated based on a speed control signal. The waveform processing circuit 20 is connected with the driver 16. The waveform processing circuit 20 performs a predetermined waveform processing on a detection signal of an actual rotating speed of the motor 3 which is inputted from the driver 16 to output a signal after the waveform processing has been performed to the integration amplifier 21. The integration amplifier 21 is connected with the control section of the host device and the waveform processing circuit 20 and an output signal from the waveform processing circuit 20 and a speed control signal are inputted to the integration amplifier 21. The integration amplifier 21 creates and outputs a feedback control signal based on the output signal from the waveform processing circuit 20 and the speed control signal.

The comparator 17 compares a level of the speed control signal with a reference value (threshold value) to output a comparison result to the gate circuit 19. As described above, the speed control signal in this embodiment is an analog signal corresponding to the speed control voltage for the motor 3, and the comparator 17 compares a value of the speed control voltage with the value of a predetermined reference voltage.

An input side of the gate circuit 19 is connected with the control section of the host device and the integration amplifier 21 and the speed control signal or the feedback control signal is capable of being inputted into the gate circuit 19. Further, the comparator 17 is connected to the input side of the gate circuit 19 into which a control signal based on a comparison result of the level of the speed control signal with the reference value is inputted. The driver 16 is connected to an output side of the gate circuit 19.

In the gate circuit 19, when the level of the speed control signal is higher than the reference value, in other words, when a rotational speed of the motor is higher than a predetermined rotational speed, the control section of the host device and the driver 16 are connected with each other based on the control signal from the comparator 17. Further, when the level of the speed control signal is lower than the reference value, in other words, when a rotational speed of the motor is lower than the predetermined rotational speed, the integration amplifier 21 and the driver 16 are connected with each other based on the control signal from the comparator 17. In other words, when the level of the speed control signal is higher than the reference value, the speed control signal is inputted into the driver 16 and, when the level of the speed control signal is lower than the reference value, the feedback control signal is inputted into the driver 16.

In other words, in this embodiment, when the level of the speed control signal is higher than the reference value, in other words, when the motor is rotated at a higher rotational speed than the predetermined rotational speed, the motor 3 is controlled in an open loop control. Further, when the level of the speed control signal is lower than the reference value, in other words, when the motor is rotated at a lower rotational speed than the predetermined rotational speed, the motor 3 is controlled in a closed loop control. More specifically, when a value of the speed control voltage for the motor 3 is higher than a value of a predetermined reference voltage, the motor 3 is controlled in an open loop control and, when the value of the speed control voltage is lower than the value of the reference voltage, the motor 3 is controlled in a closed loop control. Further, in this embodiment, the reference value which is compared with the level of the speed control signal is so determined that the control method for the motor 3 is switched from a closed loop control to an open loop control or from the open loop control to the closed loop control in a region of a low flow rate where a flow rate of the pump device 1 is relatively low.

The driver 16 creates a PWM signal based on the speed control signal or the feedback control signal which is inputted to the driver 16. Further, a voltage which is applied to a drive coil structuring the motor 3 is turned on and off by the driver 16 according to the PWM signal.

In the pump device 1 which is structured as described above, when the pump device 1 is activated, a speed control signal is inputted into the pump control device 15 from the control section of the host device. When the speed control signal is inputted into the pump control device 15, a level of the speed control signal is compared with a reference value in the comparator 17. Further, the motor 3 is controlled in an open loop control or a closed loop control on the basis of a comparison result in the comparator 17.

As described above, in this embodiment, in a case that the motor 3 is rotated at a higher rotational speed than a predetermined rotational speed, in other words, when a level of the speed control signal for the motor 3 is higher than a reference value, the motor 3 is controlled in an open loop control. Further, in a case that the motor 3 is rotated at a lower rotational speed than the predetermined rotational speed, in other words, when the level of the speed control signal is lower than the reference value, the motor 3 is controlled in a closed loop control. Further, in this embodiment, the reference value which is compared with the level of the speed control signal is determined so that a control method for the motor 3 is switched from a closed loop control to an open loop control or from the open loop control to the closed loop control in a region of a low flow rate where a flow rate of the pump device 1 is relatively low.

Therefore, in this embodiment, when the rotational speed of the motor 3 is relatively high and thus, when a flow rate of the pump device 1 is relatively large, the motor 3 is controlled in an open loop control and, at the time of a low flow rate when the rotational speed of the motor 3 is low and a flow rate of the pump device 1 is small, the motor 3 is controlled in a closed loop control. Therefore, in this embodiment, when a flow rate of the pump device 1 is relatively large, control for the pump device 1 is simplified. Further, in this embodiment, at the time of a low flow rate when a flow rate is small, the rotational speed of the motor 3 is controlled with a high degree of accuracy. As a result, at the time of a low flow rate, a flow rate of the pump device 1 is controlled with a high degree of accuracy and a variation rate of an actual flow rate to a target flow rate of the pump device 1 is reduced at the time of a low flow rate.

Although the present invention has been shown and described with reference to a specific embodiment, various changes and modifications will be apparent to those skilled in the art from the teachings herein.

In the embodiment described above, a level of the speed control signal becomes higher as the speed control voltage becomes higher and the motor 3 is rotated at a higher rotational speed. However, the present invention is not limited to this embodiment. For example, a level of the speed control signal may be lowered as the speed control voltage becomes higher for rotating the motor 3 at a higher rotational speed. In this case, the gate circuit 19 connects the control section of the host device with the driver 16 based on a control signal from the comparator 17 when a level of the speed control signal is lower than a reference value and, when the level of the speed control signal is higher than the reference value, the gate circuit 19 connects the integration amplifier 21 with the driver 16 based on the control signal from the comparator 17. In other words, in this case, when a level of the speed control signal is lower than a reference value, the motor 3 is controlled in an open loop control and, when the level of the speed control signal is higher than the reference value, the motor 3 is controlled in a closed loop control. Also in this case, similar effects to the above-mentioned embodiment can be obtained.

Figure 3:
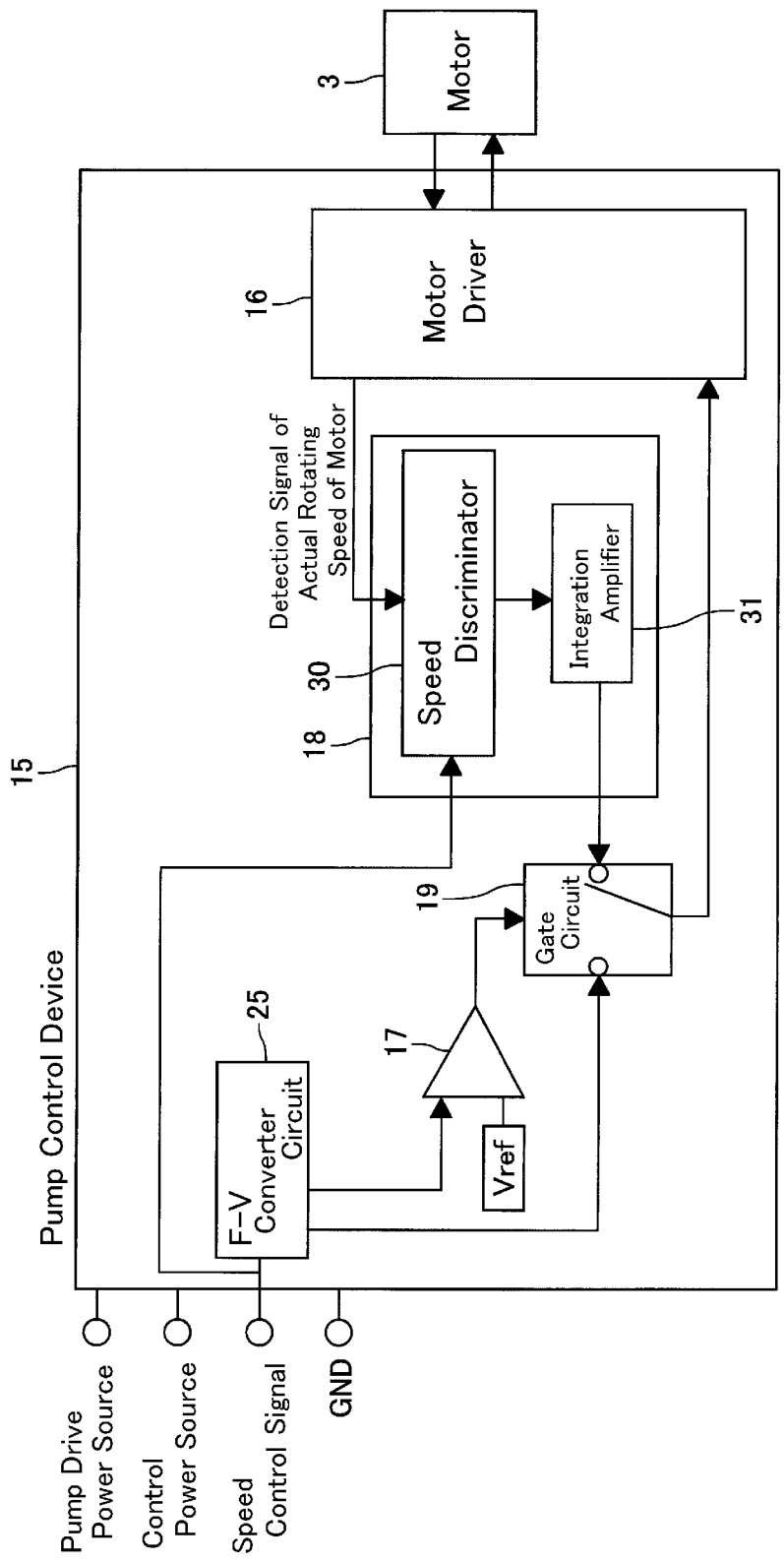
FIG. 3 is a block diagram showing a pump control device in accordance with another embodiment of the present invention.

In the embodiment described above, a speed control signal which is inputted from the control section of the host device is an analog signal corresponding to a speed control voltage for the motor 3. However, the present invention is not limited to this embodiment. For example, a speed control signal which is inputted from the control section of the host device may be a digital signal which is a speed control clock for the motor 3 that is determined depending on a target flow rate of the pump device 1. In this case, for example, as shown in FIG. 3, a speed control signal after having been converted through an F-V converter circuit (frequency-voltage converter circuit) 25 is inputted into the comparator 17. Further, the F-V converter circuit 25 is connected with an input side of the gate circuit 19 and the speed control signal after having been converted through the F-V converter circuit 25 is capable of being inputted into the gate circuit 19.

Further, in this case, for example, as shown in FIG. 3, a feedback control signal output circuit 18 is provided with a speed discriminator 30 and an integration amplifier 31. The control section of the host device and the driver 16 are connected with the speed discriminator 30 and the speed discriminator 30 creates and outputs a predetermined pulse signal to the integration amplifier 31 based on a detection signal of an actual rotating speed of the motor 3 and the speed control signal. The integration amplifier 31 creates and outputs a feedback control signal based on a pulse signal which is outputted from the speed discriminator 30.

Further, in a case that a speed control signal is a speed control clock for the motor 3, for example, it may be structured that the speed control clock is inputted into the comparator 17 as it is and a frequency of the speed control signal is compared with a predetermined reference value in the comparator 17. In this case, when the frequency of the speed control signal is higher than the reference value, the motor 3 is controlled in an open loop control and, when the frequency of the speed control signal is lower than the reference value, the motor is controlled in a closed loop control. Further, in this case, an F-V converter circuit 25 is connected with the input side of the gate circuit 19 and a speed control signal after having been converted in the F-V converter circuit 25 is capable of being inputted into the gate circuit 19.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A pump control device for use with a pump device having a DC brushless motor as a drive source wherein a flow rate of the pump device is increased and decreased depending on a corresponding increase and decrease of a rotational speed of the DC brushless motor, the pump control device comprising:
   a motor drive section which drives the DC brushless motor;
   a comparison section which compares a level of a speed control signal for the DC brushless motor with a predetermined reference value;
   a feedback control signal output section into which a detection signal of an actual rotating speed of the DC brushless motor and the speed control signal are inputted and which outputs a feedback control signal for coinciding the actual rotating speed with a target rotational speed of the DC brushless motor that is calculated based on the speed control signal; and a switching section which outputs one of the speed control signal and the feedback control signal to the motor drive section on a basis of a comparison result in the comparison section;

wherein in a case that the rotational speed of the DC brushless motor is higher than a predetermined speed, the level of the speed control signal for the DC brushless motor is inputted as a higher value than the predetermined reference value, wherein when the level of the speed control signal is higher than the predetermined reference value, the DC brushless motor is controlled in an open loop control, and when the level of the speed control signal is lower than the predetermined reference value, the DC brushless motor is controlled in a closed loop control on a basis of a measurement result of the actual rotating speed.

2. The pump control device according to claim 1, wherein the speed control signal is an analog signal corresponding to a speed control voltage for the DC brushless motor.

3. The pump control device according to claim 1, wherein in a case that the rotational speed of the DC brushless motor is higher than the predetermined speed, a frequency of the speed control signal for the DC brushless motor is inputted as a higher value than a predetermined frequency reference value, when the frequency of the speed control signal is higher than the predetermined frequency reference value, the DC brushless motor is controlled in the open loop control and, when the frequency of the speed control signal is lower than the predetermined frequency reference value, the DC brushless motor is controlled in the closed loop control.

4. The pump control device according to claim 1, wherein the predetermined reference value is determined on a basis of a target flow rate of the pump device to reduce a variation rate of an actual flow rate to the target flow rate at a low flow rate.

5. A pump control device for a pump device having a DC brushless motor as a drive source and a flow rate of the pump device is increased and decreased depending on increase and decrease of a rotational speed of the DC brushless motor, the pump control device comprising:

a motor drive section which drives the DC brushless motor;

a comparison section which compares a level of a speed control signal for the DC brushless motor with a predetermined reference value;

a feedback control signal output section into which a detection signal of the actual rotating speed and the speed control signal are inputted and which outputs a feedback control signal for coinciding an actual rotating speed of the DC brushless motor with a target rotational speed of the DC brushless motor that is calculated based on the speed control signal; and a switching section which outputs one of the speed control signal and the feedback control signal to the motor drive section on a basis of a comparison result in the comparison section;

wherein when the target rotational speed of the DC brushless motor is higher than a predetermined speed determined by the predetermined reference value, the DC brushless motor is controlled in an open loop control and, when the target rotational speed of the DC brushless motor is lower than the predetermined speed, the DC brushless motor is controlled in a closed loop control on a basis of a measurement result of the actual rotating speed.

6. The pump control device according to claim 5, wherein
when the comparison result of the comparison section indicates that the target rotational speed of the DC brushless motor is higher than the predetermined speed, the switching section outputs the speed control signal to the motor drive section, and when the comparison result of the comparison section indicates that the target rotational speed of the DC brushless motor is lower than the predetermined speed, the switching section outputs the feedback control signal to the motor drive section.

7. The pump control device according to claim 5, wherein the predetermined reference value is determined on a basis of a target flow rate of the pump device to reduce a variation rate of an actual flow rate to the target flow rate at a low flow rate.

8. A pump device comprising: an impeller; a DC brushless motor for rotating the impeller; and a pump control device for controlling the DC brushless motor so as to control a flow rate of the pump device; wherein the pump control device comprises: a motor drive section which drives the DC brushless motor; a comparison section which compares a level of a speed control signal for the DC brushless motor with a predetermined reference value; a feedback control signal output section into which a detection signal of an actual rotating speed of the DC brushless motor and the speed control signal are inputted and which outputs a feedback control signal for coinciding an actual rotating speed with a target rotational speed of the DC brushless motor that is calculated based on the speed control signal; and a switching section which outputs one of the speed control signal and the feedback control signal to the motor drive section on a basis of a comparison result in the comparison section; and wherein when the target rotational speed of the DC brushless motor is higher than a predetermined speed determined by the predetermined reference value, the DC brushless motor is controlled in an open loop control and, when the target rotational speed of the DC brushless motor is lower than the predetermined speed, the DC brushless motor is controlled in a closed loop control on a basis of a measurement result of the actual rotating speed which is the actual rotational speed of the DC brushless motor.

9. The pump device according to claim 8, wherein
when the comparison result of the comparison section indicates that the target rotational speed of the DC brushless motor is higher than the predetermined speed, the switching section outputs the speed control signal to the motor drive section, and when the comparison result of the comparison section indicates that the target rotational speed of the DC brushless motor is lower than the predetermined speed, the switching section outputs the feedback control signal to the motor drive section.

10. The pump control device according to claim 9, wherein the speed control signal is an analog signal corresponding to a speed control voltage for the DC brushless motor.

11. The pump device according to claim 8, wherein
in a case that the rotational speed of the DC brushless motor is higher than the predetermined speed, a frequency of the speed control signal for the DC brushless motor is inputted as a higher value than a predetermined frequency reference value, when the frequency of the speed control signal is higher than the predetermined frequency reference value, the DC brushless motor is controlled in the open loop control and, when the frequency of the speed control signal is lower than the predetermined frequency reference value, the DC brushless motor is controlled in the closed loop control.

12. The pump device according to claim 8, wherein the predetermined reference value is determined on a basis of a target flow rate of the pump device to reduce a variation rate of an actual flow rate to the target flow rate at a low flow rate.

* * * * *